United States Patent
Kim

(10) Patent No.: US 11,565,725 B2
(45) Date of Patent: Jan. 31, 2023

(54) METHOD OF CONTROLLING SWITCHING TO MANUAL DRIVING MODE IN AUTONOMOUS VEHICLE EQUIPPED WITH FOLDABLE PEDAL DEVICE

(71) Applicants: Hyundai Motor Company, Seoul (KR); Kia Motors Corporation, Seoul (KR)

(72) Inventor: Eun Sik Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 241 days.

(21) Appl. No.: 17/010,371

(22) Filed: Sep. 2, 2020

(65) Prior Publication Data
US 2021/0394798 A1 Dec. 23, 2021

(30) Foreign Application Priority Data
Jun. 23, 2020 (KR) ........................ 10-2020-0076793

(51) Int. Cl.
*B60W 60/00* (2020.01)
*B60K 26/02* (2006.01)
(Continued)

(52) U.S. Cl.
CPC ......... *B60W 60/0053* (2020.02); *B60K 26/02* (2013.01); *B60T 7/06* (2013.01);
(Continued)

(58) Field of Classification Search
CPC .. B60W 60/0053; B60W 40/08; B60W 50/16; B60W 2540/227; B60W 2540/221;
(Continued)

(56) References Cited

U.S. PATENT DOCUMENTS 1,156,990 A 10/1915 Foljambe
6,179,079 B1 1/2001 Basnett
(Continued)

FOREIGN PATENT DOCUMENTS

FR 2981889 A1 5/2013
KR 2017-0137427 A 12/2017

*Primary Examiner* — Dale W Hilgendorf
*Assistant Examiner* — Hana Lee
(74) *Attorney, Agent, or Firm* — Morgan, Lewis & Bockius LLP

(57) ABSTRACT

A method of controlling switching to a manual driving mode in an autonomous vehicle provided with a foldable pedal device is provided. In the method, when a signal for switching a driving mode from an autonomous driving mode to the manual driving mode is generated in an autonomous vehicle provided with a foldable accelerator pedal device and a foldable brake pedal device, whether it is possible to switch the driving mode to the manual driving mode is determined by checking safety conditions; when the safety conditions are satisfied, it is determined whether a pop-up position of a pad of the foldable accelerator pedal device and a pop-up position of a pad of the foldable brake pedal device are normal pop-up positions, respectively; and only when the positions are the respective normal pop-up positions, the driving mode is switched to the manual driving mode.

13 Claims, 3 Drawing Sheets

(Hidden state-Autonomous driving mode)

(Pop-up state-Manual driving mode)

(51) Int. Cl.
  *B60W 50/16* (2020.01)
  *B62D 1/183* (2006.01)
  *B60W 40/08* (2012.01)
  *B60T 7/06* (2006.01)

(52) U.S. Cl.
  CPC ............ *B60W 40/08* (2013.01); *B60W 50/16* (2013.01); *B62D 1/183* (2013.01); *B60K 2026/026* (2013.01); *B60T 2220/02* (2013.01); *B60W 2040/0881* (2013.01); *B60W 2420/42* (2013.01); *B60W 2420/54* (2013.01); *B60W 2540/221* (2020.02); *B60W 2540/227* (2020.02)

(58) Field of Classification Search
  CPC ..... B60W 2040/0881; B60W 2420/42; B60W 2420/54; B60K 26/02; B60K 2026/026; B60T 7/06; B60T 2220/02; B62D 1/183
  See application file for complete search history.

(56) References Cited

U.S. PATENT DOCUMENTS

| | | | |
|---|---|---|---|
| 6,182,525 B1 | 2/2001 | Bowers | |
| 6,364,047 B1 | 4/2002 | Bortolon | |
| 9,283,934 B2 | 3/2016 | Shand | |
| 10,739,011 B2 | 8/2020 | Cowan | |
| 10,889,226 B1 * | 1/2021 | Dean | B60T 7/06 |
| 10,906,514 B1 | 2/2021 | Kim et al. | |
| 10,913,419 B2 | 2/2021 | Mullen et al. | |
| 10,946,741 B1 | 3/2021 | Kim et al. | |
| 10,988,097 B2 | 4/2021 | Ghaffari et al. | |
| 2001/0015111 A1 | 8/2001 | Rixon et al. | |
| 2003/0110879 A1 | 6/2003 | Massey, III et al. | |
| 2004/0259687 A1 | 12/2004 | Ritter | |
| 2008/0147287 A1 | 6/2008 | Park | |
| 2009/0223319 A1 | 9/2009 | Choi | |
| 2010/0139445 A1 | 6/2010 | Kim | |
| 2011/0132134 A1 | 6/2011 | Kim | |
| 2013/0125682 A1 | 5/2013 | Kim | |
| 2014/0311278 A1 | 10/2014 | Min | |
| 2014/0316648 A1 | 10/2014 | Min | |
| 2014/0373667 A1 | 12/2014 | Kim | |
| 2015/0107402 A1 | 4/2015 | Leem | |
| 2015/0253804 A1 | 9/2015 | Baur et al. | |
| 2017/0320501 A1 * | 11/2017 | Li | B60K 37/06 |
| 2018/0093675 A1 * | 4/2018 | Holub | A61B 5/18 |
| 2019/0118852 A1 | 4/2019 | Suzuki et al. | |
| 2019/0310678 A1 | 10/2019 | Wojciechowski et al. | |
| 2020/0317152 A1 * | 10/2020 | Ghaffari | B60T 7/042 |
| 2021/0061312 A1 * | 3/2021 | Wang | B60W 50/14 |
| 2021/0146899 A1 * | 5/2021 | Bayer | B60T 7/22 |
| 2022/0144224 A1 * | 5/2022 | Tarandek | B60T 7/06 |

* cited by examiner

METHOD OF CONTROLLING SWITCHING TO MANUAL DRIVING MODE IN AUTONOMOUS VEHICLE EQUIPPED WITH FOLDABLE PEDAL DEVICE

CROSS REFERENCE TO RELATED APPLICATION

The present application claims priority to Korean Patent Application No. 10-2020-0076793, filed Jun. 23, 2020, the entire contents of which is incorporated herein for all purposes by this reference.

BACKGROUND OF THE INVENTION

Field of the Invention

The present invention relates to a method of controlling switching to a manual driving mode in an autonomous vehicle provided with a foldable pedal device. More particularly, the present invention relates to a technology for a control method in the case of switching a mode from an autonomous driving mode to a manual driving mode, the method facilitating switching to the manual driving mode only when safety conditions and a pop-up position condition of a pad are satisfied.

Description of Related Art

An autonomous vehicle is a smart vehicle onto which an autonomous driving technology is grafted, in which a vehicle self-drives to a destination even though the driver does not manipulate a steering wheel, an accelerator pedal, a brake, and the like, manually. Recently, the autonomous vehicle has been developed rapidly.

When an autonomous driving situation is generally realized, it is possible to select a manual driving mode in which the driver drives manually, and an autonomous driving mode in which the driver does not drive manually while the vehicle self-drives to the destination.

In the autonomous driving mode, the driver may wish to stretch out his or her legs and take a rest comfortably. Therefore, in the autonomous driving mode, when pedals (an accelerator pedal, and a brake pedal) positioned in the space below the driver seat remain exposed in the interior of the vehicle, the pedals interfere with the driver's rest. In particular, regardless of the driver's will, when pads of pedal devices are erroneously manipulated, the autonomous driving is forcibly terminated and there is a high risk that an accident will happen.

Therefore, for the autonomous vehicle, a foldable pedal device has been developed. The foldable pedal device ensures that in the manual driving mode in which the driver drives manually, the pad of the pedal device is exposed protruding toward the driver so that the driver can manipulate the pad, and in the autonomous driving mode, the pad of the pedal device is hidden not to protrude toward the driver so that the manipulation by the driver is impossible, facilitating the driver's comfortable rest and the driver's safety, such as prevention of erroneous manipulation, or the like.

In a situation in which the autonomous vehicle provided with such a foldable pedal device drives in the autonomous driving mode, in the case where a signal for switching, by the controller, the driving mode to the manual driving mode is generated, there is no process of checking a safety condition to determine whether it is possible to switch the driving mode to the manual driving mode, in the related art. Due to the provided configuration, the pad of the pedal device is operated to protrude toward the driver according to the signal of the manual driving mode, and there is a risk that an accident will happen as the pad of the pedal device is erroneously manipulated by the driver.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling switching of a driving mode, wherein when a signal for switching the driving mode from an autonomous driving mode to a manual driving mode is generated in an autonomous vehicle provided with a foldable accelerator pedal device and a foldable brake pedal device, whether it is possible to switch the driving mode to the manual driving mode is determined by checking safety conditions; when the safety conditions are satisfied, it is determined whether a pop-up position of a pad of the accelerator pedal device and a pop-up position of a pad of the brake pedal device are normal pop-up positions, respectively; and only when the position of the pad of the accelerator pedal device and the position of the pad of the brake pedal device are the respective normal pop-up positions, the driving mode is switched to the manual driving mode. Accordingly, an accident caused by erroneous manipulation is prevented from occurring, and the driving safety is improved.

Various aspects of the present invention are directed to providing a method of controlling switching to a manual driving mode in an autonomous vehicle provided with a foldable pedal device, the method including: determining, by a controller at a determination step, whether it is possible to switch the driving mode to a manual driving mode, by use of a detection signal of a safety check sensor, when a signal for the manual driving mode is generated in an autonomous driving mode; operating, by the controller at a pad pop-up step, a first actuator of a foldable accelerator pedal device and a second actuator of a foldable brake pedal device under the control of the controller when the controller determines that it is possible to switch the driving mode to the manual driving mode at the determination step, and performing a pop-up operation of the foldable accelerator pedal device and the foldable brake pedal device so that a pad of the foldable accelerator pedal device and a pad of the foldable brake pedal device protrude toward a driver by the operation of the first actuator and the second actuator, respectively; detecting, at a pad position detection step after the pad pop-up step, a position of the pad of the foldable accelerator pedal device and a position of the pad of the foldable brake pedal device by use of a first pad position sensor and a second pad position sensor connected to the controller, respectively; and switching, by the controller, the driving mode to the manual driving mode only when the controller is configured to determine that the position of the pad of the foldable accelerator pedal device and the position of the pad of the foldable brake pedal device are normal pop-up positions, respectively, at the pad position detection step.

When the controller determines at the determination step that it is impossible to switch the driving mode to the manual driving mode, a warning device is operated by the control of the controller, the pad of the foldable accelerator pedal device and the pad of the foldable brake pedal device are kept in a hidden state in which the pads of the foldable accelerator pedal device and the foldable brake pedal device are hidden so as not to protrude in the predetermined direction, and the vehicle maintains the autonomous driving mode.

When it is determined at the pad position detection step that even any one among the position of the pad of the foldable accelerator pedal device and the position of the pad of the foldable brake pedal device is not the normal pop-up position, a warning device is operated by the control of the controller, the pad of the foldable accelerator pedal device and the pad of the foldable brake pedal device return to a hidden state in which the pads of the foldable accelerator pedal device and the foldable brake pedal device are hidden so as not to protrude in the predetermined direction, and the vehicle maintains the autonomous driving mode.

After the pad position detection step, when the vehicle switches the driving mode from the autonomous driving mode to the manual driving mode, a steering wheel of the vehicle performs a pop-up operation of protruding toward the driver, simultaneously under the control of the controller.

When the pad of the foldable accelerator pedal device and the pad of the foldable brake pedal device are kept in the hidden state, the steering wheel of the vehicle is also kept in a hidden state in which the steering wheel is hidden so as not to protrude in the predetermined direction under the control of the controller.

The detection signal of the safety check sensor may be a signal of a first condition for detecting whether the driver is in the vehicle, by use of a driver detection sensor, and the controller is configured to determine that it is possible to switch the driving mode to the manual driving mode, only when the first condition in which the driver is in the vehicle is satisfied.

The detection signal of the safety check sensor may be a signal of a second condition for detecting a position of a driver seat by use of a seat position sensor, and the controller is configured to determine that it is possible to switch the driving mode to the manual driving mode, only when the first condition, and the second condition in which the position of the driver seat is a position where manual driving of the vehicle is possible are satisfied.

The detection signal of the safety check sensor may be a signal of a third condition for detecting a current state of the driver by use of a driver state detection sensor, and the controller is configured to determine that it is possible to switch the driving mode to the manual driving mode, only when the first condition, the second condition, and the third condition in which the current state of the driver is a state where manual driving of the vehicle is possible are satisfied.

The driver detection sensor may be a weight sensor or an ultrasonic sensor, and the driver state detection sensor may be a sensor using camera information.

A warning generated by the warning device may include at least one among a visual warning, an auditory warning, and a tactile warning.

According to the exemplary embodiment of the present invention, when a signal for switching the driving mode from the autonomous driving mode to the manual driving mode is generated in the autonomous vehicle provided with the foldable accelerator pedal device and the foldable brake pedal device, whether it is possible to switch the driving mode to the manual driving mode is determined first by checking the safety conditions through the safety check sensor. When the safety conditions are satisfied, it is determined whether the pop-up position of the pad of the foldable accelerator pedal device and the pop-up position of the pad of the foldable brake pedal device are the respective normal pop-up positions. Only when the position of the pad of the foldable accelerator pedal device and the position of the pad of the foldable brake pedal device are the respective normal pop-up positions, the driving mode is switched to the manual driving mode and simultaneously, the steering wheel is popped up to enable manipulation by the driver. Accordingly, an accident caused by erroneous manipulation is prevented from occurring and the driving safety is greatly improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
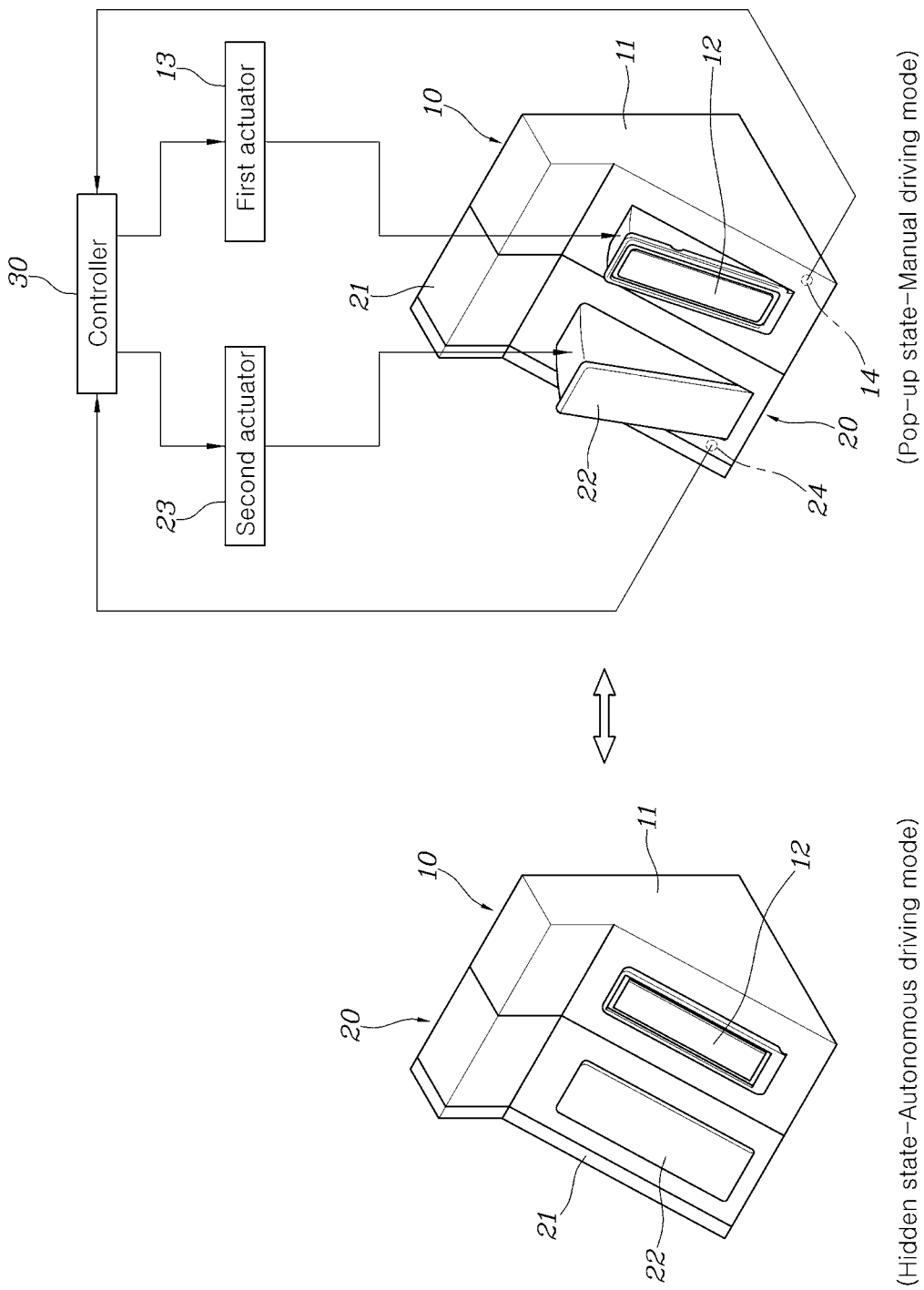
FIG. 1 is a perspective view showing a foldable accelerator pedal device and a foldable brake pedal device to which various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of embodiments of the present specification or application included herein are only for illustrative purposes of the exemplary embodiments of the present invention. The exemplary embodiments of the present invention may be embodied in various forms, and the exemplary embodiments of the present specification or application may not be construed as limiting the present invention.

Since the exemplary embodiment of the present invention may be modified in various ways and may have various forms, various exemplary embodiments are shown in the drawings and will be described in the present specification or application in detail. However, the exemplary embodiment according to the concept of the present invention may not be construed as limited to a particular disclosure, and it may be understood that all modifications, equivalents or alternatives falling within the idea and technical scope of the present invention are included.

Terms "first", "second", etc. used in the specification may be used to describe various elements, but the elements are not to be construed as being limited to the terms. These terms are only used to distinguish one element from another element. For instance, a first element could be termed a second element without departing from the scope of the present invention. Similarly, the second element could also be termed the first element.

It will be understood that when an element is referred to as being "coupled" or "connected" to another element, it may be directly coupled or connected to the other element or intervening elements may be present therebetween. In contrast, it will be understood that when an element is referred to as being "directly coupled" or "directly connected" to another element, there are no intervening elements present. Other words used to describe the relationship between elements, such as "between", "directly between", "adjacent", and "directly adjacent", may be construed in the same way.

The terms used in the present specification are merely used to describe various exemplary embodiments of the present invention, and are not intended to limit the present invention. As used herein, the singular forms "a", "an", and "the" are intended to include the plural forms as well, unless the context clearly indicates otherwise. It is to be understood that terms such as "including", "having", etc. are intended to indicate the existence of the features, numbers, steps, actions, elements, parts, or combinations thereof included in the present specification, and are not intended to preclude the possibility that one or more other features, numbers, steps, actions, elements, parts, or combinations thereof may exist or may be added.

Unless otherwise defined, all terms including technical and scientific terms used herein have the same meaning as commonly understood by those skilled in the art to which various exemplary embodiments of the present invention belongs. It will be further understood that terms used herein may be interpreted as having a meaning which is consistent with their meaning in the context of the present specification and the relevant art and will not be interpreted in an idealized or overly formal sense unless so defined herein.

A control unit (controller) according to various exemplary embodiments of the present invention may be implemented through a non-volatile memory and a processor, wherein the non-volatile memory is configured to store data related to an algorithm for controlling operations of various elements of a vehicle or to software instructions for reproducing the algorithm, and the processor is configured to perform an operations described below, by use of the data stored in the memory. Herein, the memory and the processor may be implemented as separate chips. Alternatively, the memory and the processor may be implemented as an integrated single chip. The processor may be provided as a form of one or more processors.

Hereinafter, a method of controlling switching to a manual driving mode in an autonomous vehicle provided with a foldable pedal device according to various exemplary embodiments of the present invention will be described with reference to the accompanying drawings.

The autonomous vehicle may select a manual driving mode in which the driver manually drives, and an autonomous driving mode in which the driver does not manually drive while the vehicle self-drives to a destination.

Furthermore, the autonomous vehicle may be provided with a foldable pedal device. The foldable pedal device includes a foldable accelerator pedal device 10 and a foldable brake pedal device 20 as shown in FIG. 1.

The foldable accelerator pedal device 10 and the foldable brake pedal device 20 include housings 11 and 21, respectively, and include pads 12 and 22 rotatably coupled to the respective housings 11 and 21, respectively.

The housings 11 and 21 may be mounted to be positioned in a space below the driver seat in the interior of the vehicle. The pads 12 and 22 are manipulated by the driver's foot.

In the manual driving mode in the autonomous vehicle provided with the foldable accelerator pedal device 10 and the foldable brake pedal device 20, the driver manually manipulates the pads 12 and 22 with the foot. To this end, the pads 12 and 22 need to be in a pop-up state in which the pads 12 and 22 protrude from the respective housings 11 and 21 to be exposed toward the driver.

Furthermore, in the autonomous driving mode, for the driver's comfortable rest and safety, such as prevention of erroneous manipulation, and the like, the pads 12 and 22 need to be in a hidden state in which the pads 12 and 22 are inserted into the respective housings 11 and 21 are thus hidden, so that the pads 12 and 22 do not protrude toward the driver.

To implement the pop-up state and the hidden state of the pads 12 and 22 as described above, the foldable accelerator pedal device 10 and the foldable brake pedal device 20 further include a first actuator 13 and a second actuator 23, respectively, which forcibly rotate the respective pads 12 and 22. The first actuator 13 and the second actuator 23 each may include a motor, and operations thereof are controlled by a controller 30.

According to various exemplary embodiments of the present invention, when a signal for the manual driving mode is generated in the autonomous vehicle provided with the foldable accelerator pedal device 10 and the foldable brake pedal device 20 during autonomous driving, whether it is possible to switch the driving mode to the manual driving mode is determined first through safety conditions. When the safety conditions are satisfied, it is determined whether the pop-up position of the pad 12 of the foldable accelerator pedal device 10 and the pop-up position of the pad 22 of the foldable brake pedal device 20 are normal pop-up positions, respectively. Only when the position of the pad 12 of the foldable accelerator pedal device 10 and the position of the pad 22 of the foldable brake pedal device 20 are the respective normal pop-up positions, the driving mode is switched to the manual driving mode and simultaneously, a steering wheel 70 is popped upwards to enable manipulation by the driver.

Figure 2:
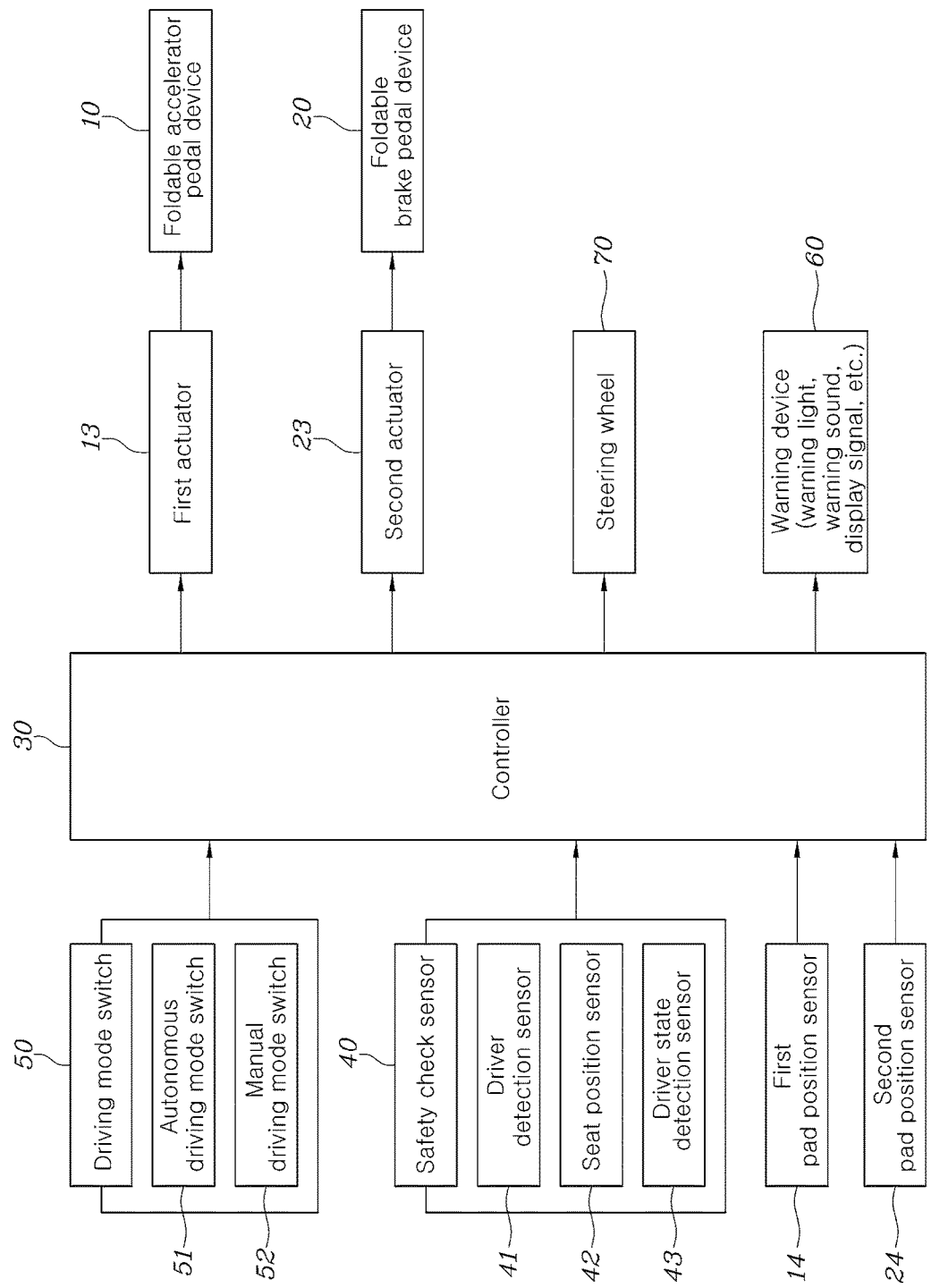
FIG. 2 and FIG. 3 are a schematic block diagram and a flowchart, respectively, showing a method of controlling switching from an autonomous driving mode to a manual driving mode according to various exemplary embodiments of the present invention.
Figure 3:
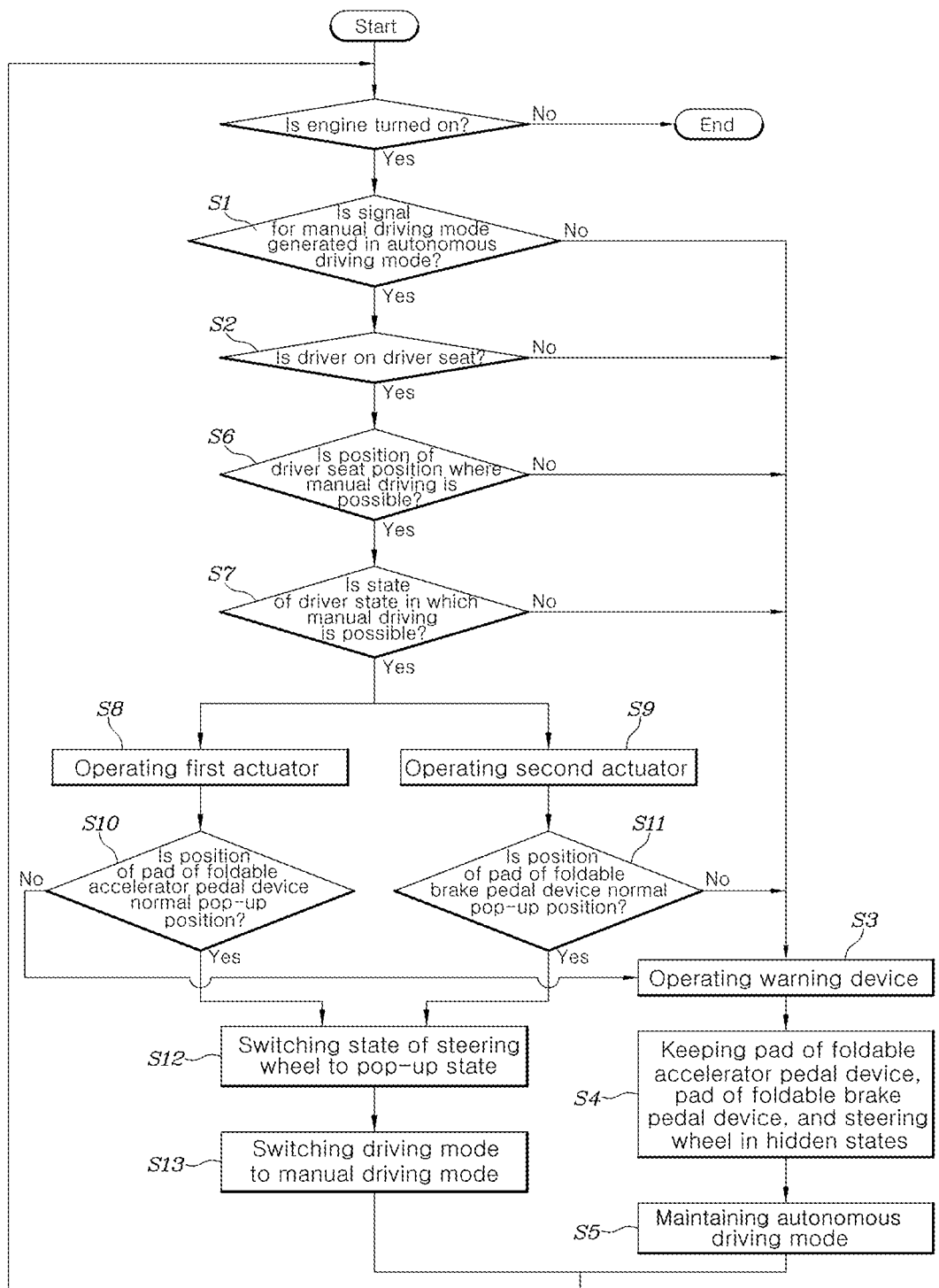

That is, as shown in FIG. 1, FIG. 2, and FIG. 3, according to various exemplary embodiments of the present invention, the method includes: determining, by the controller 30 at a determination step, whether it is possible to switch the driving mode to the manual driving mode, by use of a detection signal of a safety check sensor 40, when a signal for the manual driving mode is generated in the autonomous driving mode; operating, at a pad pop-up step, the first actuator 13 of the foldable accelerator pedal device 10 and the second actuator 23 of the foldable brake pedal device 20 under the control of the controller 30 when the controller determines that it is possible to switch the driving mode to the manual driving mode at the determination step, and performing a pop-up operation so that the pad 12 of the foldable accelerator pedal device 10 and the pad 22 of the foldable brake pedal device 20 protrude toward the driver by the operation of the first actuator 13 and the second actuator 23, respectively; detecting, at a pad position detection step after the pad pop-up step, a position of the pad 12 of the foldable accelerator pedal device 10 and a position of the pad 22 of the foldable brake pedal device 20 by use of a first pad position sensor 14 and a second pad position sensor 24, respectively; and switching, by the controller, the driving mode to the manual driving mode only when the controller 30 determines that the position of the pad 12 of the foldable accelerator pedal device 10 and the position of the pad 22 of the foldable brake pedal device 20 are normal pop-up positions, respectively, at the pad position detection step.

The driving modes of the autonomous vehicle may be switched by, for example, manipulation of a driving mode switch 50. The driving mode switch 50 may include an autonomous driving mode switch 51 and a manual driving mode switch 52.

When the controller determines at the determination step that it is impossible to switch the driving mode to the manual driving mode, a warning device 60 is operated under the control of the controller 30, and the pad 12 of the foldable accelerator pedal device 10 and the pad 22 of the foldable brake pedal device 20 are kept in the hidden state in which the pads 12 and 22 are hidden so as not to protrude toward the driver. Here, the vehicle maintains the autonomous driving mode.

When it is determined at the pad position detection step that even any one among the position of the pad 12 of the foldable accelerator pedal device 10 and the position of the pad 22 of the foldable brake pedal device 20 is not the normal pop-up position, the warning device 60 is operated by the controller 30, and the pad 12 of the foldable accelerator pedal device 10 and the pad 22 of the foldable brake pedal device 20 return to the hidden state in which the pads 12 and 22 are hidden so as not to protrude toward the driver, by operation of the first and the second actuator 13 and 23 under the control of the controller 30. The vehicle maintains the autonomous driving mode.

As the warning device 60, a warning light, a warning-sound generator, a display, or the like may be used. The warning generated by the warning device 60 preferably includes at least one among a visual warning, an auditory warning, and a tactile warning.

when the pad 12 of the foldable accelerator pedal device 10 and the pad 22 of the foldable brake pedal device 20 perform a pop-up operation of protruding toward the driver, the steering wheel 70 of the vehicle also simultaneously performs a pop-up operation of protruding toward the driver under the control of the controller 30, for manual driving by the driver.

Conversely, when the pad 12 of the foldable accelerator pedal device 10 and the pad 22 of the foldable brake pedal device 20 are kept in the hidden state, the steering wheel 70 of the vehicle is also kept in a hidden state in which the steering wheel 70 is hidden so as not to protrude toward the driver under the control of the controller 30, for autonomous driving.

The detection signal of the safety check sensor 40 is a signal of a first condition for detecting whether the driver is in the vehicle, by use of a driver detection sensor 41. The controller 30 determines that it is possible to switch the driving mode to the manual driving mode, only when the first condition in which the driver is in the vehicle is satisfied.

The driver detection sensor 41 may use either a weight sensor that identifies whether a passenger is in the vehicle, on the basis of weight, or an ultrasonic sensor that identifies whether a passenger is in the vehicle, on the basis of ultrasound.

Furthermore, the detection signal of the safety check sensor 40 is a signal of a second condition for detecting the position of the driver seat by use of a seat position sensor 42. The controller 30 determines that it is possible to switch the driving mode to the manual driving mode, only when both of the first condition, and the second condition in which the position of the driver seat is a position where manual driving of the vehicle is possible are satisfied.

Furthermore, the detection signal of the safety check sensor 40 is a signal of a third condition for detecting the current state of the driver by use of a driver state detection sensor 43. The controller 30 determines that it is possible to switch the driving mode to the manual driving mode, only when the first condition, the second condition, and the third condition in which the state of the driver is a state where manual driving of the vehicle is possible are satisfied.

The driver state detection sensor 43 is a sensor using camera information, and is a system that utilizes an infrared-ray (IR) light-emitting diode (LED) and a camera to acquire images of the driver's face direction and the opening and the closing of the eyes, and determines an inattentive-driving situation on the basis of the acquired images, and then provides an early warning in conjunction with a chassis safety system before an accident occurs, implementing a pre-safety function.

The chassis safety system may include at least one among a smart cruise control system, a highway driving assist system, a forward collision-avoidance assist system, a blind-spot collision-avoidance assist system, and a rear cross-traffic collision-avoidance assist system.

The first pad position sensor 14 and the second pad position sensor 24 are sensors that detect the position of the pad 12 of the foldable accelerator pedal device 10 and the position of the pad 22 of the foldable brake pedal device 20, respectively. The positions of the pads 12 and 22 may be detected through the rotation angles of the pads 12 and 22. To this end, a Hall sensor may be used.

In the case of the autonomous vehicle provided with the foldable pedal device, for example, when a vehicle door is open and the engine is turned on, the autonomous driving mode is recognized as a default.

In the autonomous driving mode, the signal for the manual driving mode is generated by the manipulation of the manual driving mode switch 52 at step S1. The controller 30 determines whether the driver is in the vehicle, by use of the detection signal of the driver detection sensor 41 at step S2.

When it is determined that the driver is not in the vehicle, the warning device 60 is operated for safety at step S3. The pad 12 of the foldable accelerator pedal device 10, the pad 22 of the foldable brake pedal device 20, and the steering wheel 70 are kept in the hidden states at step S4. The vehicle maintains the autonomous driving mode at step S5.

When it is determined that the driver is in the vehicle, it is determined whether the position of the driver seat is a position where manual driving is possible, by use of the detection signal of the seat position sensor 42 at step S6.

When it is determined that the position of the driver seat is a position where manual driving is impossible, the warning device 60 is operated for safety at step. The pad 12 of the foldable accelerator pedal device 10, the pad 22 of the foldable brake pedal device 20, and the steering wheel 70 are kept in the hidden states at step S4. The vehicle maintains the autonomous driving mode at step S5.

When it is determined that the position of the driver seat is a position where manual driving is possible, it is determined whether the current state of the driver is a state in which manual driving is possible, by use of the detection signal of the driver state detection sensor 43 at step S7.

When it is determined that the current state of the driver is a state in which manual driving is impossible, the warning device 50 is operated for safety at step S3. The pad 12 of the foldable accelerator pedal device 10, the pad 22 of the foldable brake pedal device 20, and the steering wheel 70 are kept in the hidden states at step S4. The vehicle maintains the autonomous driving mode at step S5.

When it is determined that the current state of the driver is a state in which manual driving is possible, the first actuator 13 and the second actuator 23 are operated under the control of the controller 30 at steps S8 and S9, respectively.

With the operation of the first actuator 13, the state of the pad 12 of the foldable accelerator pedal device 10 is switched from the hidden state to the pop-up state. With the operation of the second actuator 23, the state of the pad 22 of the foldable brake pedal device 20 is switched from the hidden state to the pop-up state.

When the first actuator 13 is operated, the first pad position sensor 14 detects the rotation angle of the pad 12 of the foldable accelerator pedal device 10 to detect the position of the pad 12 of the foldable accelerator pedal device 10. Furthermore, when the second actuator 23 is operated, the second pad position sensor 24 detects the rotation angle of the pad 22 of the foldable brake pedal device 20 to detect the position of the pad 22 of the foldable brake pedal device 20.

After the first actuator 13 is operated, the controller 30 determines whether the position of the pad 12 of the foldable accelerator pedal device 10 is the normal pop-up position, by use of the detection signal of the first pad position sensor 14 at step S10.

Furthermore, after the second actuator 23 is operated, the controller 30 determines whether the position of the pad 22 of the foldable brake pedal device 20 is the normal pop-up position, by use of the detection signal of the second pad position sensor 24 at step S11.

As a result of the determination at steps S10 and S11, only when it is determined that the position of the pad 12 of the foldable accelerator pedal device 10 and the position of the pad 22 of the foldable brake pedal device 20 are the normal pop-up positions, the state of the steering wheel 70 is switched from the hidden state to the pop-up state at step S12, and the vehicle is controlled so that the driving mode is switched from the autonomous driving mode to the manual driving mode.

However, as a result of the determination at steps S10 and S11, when it is determined that even any one among the position of the pad 12 of the foldable accelerator pedal device 10 and the position of the pad 22 of the foldable brake pedal device 20 is not the normal pop-up position, the warning device 50 is operated for safety at step S3. The pad 12 of the foldable accelerator pedal device 10 and the pad 22 of the foldable brake pedal device 20 return to the hidden state in which the pads 12 and 22 are hidden so as not to protrude toward the driver, by operation of the first and the second actuator 13 and 23 under the control of the controller 30. The steering wheel 70 is kept in the hidden state at step S4. The vehicle maintains the autonomous driving mode at step S5.

As described above, according to the exemplary embodiment of the present invention, when a signal for switching the driving mode from the autonomous driving mode to the manual driving mode is generated in the autonomous vehicle provided with the foldable accelerator pedal device 10 and the foldable brake pedal device 20, whether it is possible to switch the driving mode to the manual driving mode is determined by checking the safety conditions through the safety check sensor 40. When the safety conditions are satisfied, it is determined whether the pop-up position of the pad 12 of the foldable accelerator pedal device 10 and the pop-up position of the pad 22 of the foldable brake pedal device 20 are the respective normal pop-up positions. Only when the position of the pad 12 of the foldable accelerator pedal device 10 and the position of the pad 22 of the foldable brake pedal device 20 are the respective normal pop-up positions, the driving mode is switched to the manual driving mode and simultaneously, the steering wheel 70 is popped upwards to enable manipulation by the driver. Accordingly, an accident caused by erroneous manipulation is prevented from occurring and the driving safety is greatly improved.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling switching of a driving mode in a vehicle provided with a foldable pedal device, the method including:
    determining, by a controller at a determination step, whether it is possible to switch the driving mode to a manual driving mode, by use of a detection signal of a safety check sensor, when a signal for the manual driving mode is generated in an autonomous driving mode;
    operating, by the controller at a pad pop-up step, a first actuator of a foldable accelerator pedal device and a second actuator of a foldable brake pedal device when the controller determines that it is possible to switch the driving mode to the manual driving mode at the determination step, and performing a pop-up operation of the foldable accelerator pedal device and the foldable brake pedal device so that a pad of the foldable accelerator pedal device and a pad of the foldable brake pedal device protrude in a predetermined direction by operation of the first actuator and the second actuator, respectively;
    detecting, at a pad position detection step after the pad pop-up step, a position of the pad of the foldable accelerator pedal device and a position of the pad of the foldable brake pedal device by use of a first pad position sensor and a second pad position sensor connected to the controller, respectively; and
    switching, by the controller, the driving mode to the manual driving mode when the controller determines that a position of the pad of the foldable accelerator pedal device and the position of the pad of the foldable brake pedal device are normal pop-up positions, respectively, at the pad position detection step,
    wherein when the controller determines at the pad position detection step that one among the position of the pad of the foldable accelerator pedal device and the position of the pad of the foldable brake pedal device is not one of the normal pop-up positions, a warning device is operated by the control of the controller, the pad of the foldable accelerator pedal device and the pad of the foldable brake pedal device return to a hidden state in which the pads of the foldable accelerator pedal device and the foldable brake pedal device are hidden so as not to protrude in the predetermined direction, and the vehicle maintains the autonomous driving mode.

2. The method of claim 1, wherein when the controller determines at the determination step that it is impossible to switch the driving mode to the manual driving mode, the warning device is operated by the control of the controller, the pad of the foldable accelerator pedal device and the pad of the foldable brake pedal device are kept in the hidden state in which the pads of the foldable accelerator pedal device and the foldable brake pedal device are hidden so as not to protrude in the predetermined direction, and the vehicle maintains the autonomous driving mode.

3. The method of claim 2, wherein when the pad of the foldable accelerator pedal device and the pad of the foldable brake pedal device are kept in the hidden state, a steering wheel of the vehicle is kept in a hidden state in which the steering wheel is hidden so as not to protrude in the predetermined direction under the control of the controller.

4. The method of claim 2, wherein a warning generated by the warning device includes at least one among a visual warning, an auditory warning, and a tactile warning.

5. The method of claim 1, wherein after the pad position detection step, when the vehicle switches the driving mode from the autonomous driving mode to the manual driving mode, a steering wheel of the vehicle performs a pop-up operation of protruding in the predetermined direction, under the control of the controller.

6. The method of claim 1, wherein when the pad of the foldable accelerator pedal device and the pad of the foldable brake pedal device are kept in the hidden state, a steering wheel of the vehicle is kept in a hidden state in which the steering wheel is hidden so as not to protrude in the predetermined direction under the control of the controller.

7. The method of claim 1,
    wherein the detection signal of the safety check sensor comprises a signal of a first condition for detecting whether the driver is in the vehicle, by use of a driver detection sensor, and
    wherein the controller is configured to determine that it is possible to switch the driving mode to the manual driving mode, when the first condition in which the driver is in the vehicle is satisfied.

8. The method of claim 7,
    wherein the detection signal of the safety check sensor further comprises a signal of a second condition for detecting a position of a driver seat by use of a seat position sensor, and
    wherein the controller is configured to conclude that it is possible to switch the driving mode to the manual driving mode, when the first condition, and the second condition in which the position of the driver seat is a position where manual driving of the vehicle is possible, are satisfied.

9. The method of claim 8,
    wherein the detection signal of the safety check sensor further comprises a signal of a third condition for detecting a current state of the driver by use of a driver state detection sensor, and
    wherein the controller is configured to conclude that it is possible to switch the driving mode to the manual driving mode, when the first condition, the second condition, and the third condition in which the current state of the driver is a state where the manual driving of the vehicle is possible, are satisfied.

10. The method of claim 9,
wherein the driver detection sensor is a weight sensor or an ultrasonic sensor, and
wherein the driver state detection sensor is a sensor using camera information.

11. The method of claim 1, wherein a warning generated by the warning device includes at least one among a visual warning, an auditory warning, and a tactile warning.

12. The method of claim 1, wherein the controller includes:
a processor; and
a non-transitory storage medium on which a program for performing the method of claim 1 is recorded and executed by the processor.

13. A non-transitory computer readable medium on which a program for performing the method of claim 1 is recorded.

* * * * *